(12) United States Patent
Xiao (10) Patent No.: US 11,875,171 B2
(45) Date of Patent: Jan. 16, 2024

(54) BLOCKCHAIN NETWORK TRANSACTION PROCESSING METHOD, APPARATUS, DEVICE, AND STORAGE MEDIUM

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 800 days.

(21) Appl. No.: 16/966,386

(22) PCT Filed: Jan. 18, 2019

(86) PCT No.: PCT/CN2019/072338
§ 371 (c)(1),
(2) Date: Jul. 30, 2020

(87) PCT Pub. No.: WO2019/218718
PCT Pub. Date: Nov. 21, 2019

(65) Prior Publication Data
US 2020/0364075 A1      Nov. 19, 2020

(30) Foreign Application Priority Data

May 17, 2018 (CN) .......................... 201810475580.8

(51) Int. Cl.
*G06F 9/46*         (2006.01)
*G06F 9/455*        (2018.01)
(Continued)

(52) U.S. Cl.
CPC ....... *G06F 9/45558* (2013.01); *G06Q 20/065* (2013.01); *H04L 9/0637* (2013.01);
(Continued)

(58) Field of Classification Search
CPC ...... G06F 9/45558; G06F 2009/45595; G06Q 20/065; G06Q 2220/00; H04L 9/0637; H04L 9/50
See application file for complete search history.

(56) References Cited

U.S. PATENT DOCUMENTS

2015/0356524 A1    12/2015 Pennanen
2017/0353309 A1    12/2017 Gray
2018/0089641 A1    3/2018 Chan et al.

FOREIGN PATENT DOCUMENTS

CN       106548330 A      3/2017
CN       106682984 A      5/2017
(Continued)

OTHER PUBLICATIONS

International Search Report for PCT Application No. PCT/CN2019/072338, dated Apr. 1, 2019, 20 pages.
(Continued)

*Primary Examiner* — Diem K Cao
(74) *Attorney, Agent, or Firm* — Lippes Mathias LLP (57) ABSTRACT

A method and an apparatus for processing a transaction in a blockchain network, a related device, and storage medium are disclosed. The method includes the following. A transaction submission request in a form of readable data field is obtained, and the data field in the transaction submission request is processed. If a target field exists during processing the data field, a virtual machine is called to execute logical codes corresponding to the target field. According to a code execution result from the virtual machine and a processing result of the data field, a processing result of the transaction submission request is determined.

20 Claims, 5 Drawing Sheets

```
obtaining a transaction submission request in a form of readable
data field, and processing a data field in the transaction          ~ S110
submission request in a case of recognizing that a target field exists during processing
the data field, calling a virtual machine to execute logical codes  ~ S120
corresponding to the target field determining a processing result of the transaction submission
request based on a code executing result from the virtual machine   ~ S130
and a processing result of the data field
```

(51) Int. Cl.
*G06Q 20/06* (2012.01)
*H04L 9/06* (2006.01)
*H04L 9/00* (2022.01)

(52) U.S. Cl.
CPC .............. *G06F 2009/45595* (2013.01); *G06Q 2220/00* (2013.01); *H04L 9/50* (2022.05)

(56) References Cited

FOREIGN PATENT DOCUMENTS

| | | | | |
|---|---|---|---|---|
| CN | 106940854 | A | 7/2017 | |
| CN | 107360238 | A | 11/2017 | |
| CN | 107528912 | A | 12/2017 | |
| CN | 107688944 | A | 2/2018 | |
| CN | 107993149 | A | 5/2018 | |
| CN | 108664650 | A | 10/2018 | |
| CN | 108664650 | B * | 5/2020 | ......... G06F 9/45558 |
| JP | 6247737 | B1 | 12/2017 | |
| JP | 2018525729 | A | 9/2018 | |
| JP | 2019515534 | A | 6/2019 | |
| JP | 2019522264 | A | 8/2019 | |
| JP | 7110343 | B2 * | 8/2022 | ......... G06F 9/45558 |
| KR | 101857223 | B1 | 5/2018 | |
| WO | 20170187395 | A1 | 11/2017 | |
| WO | 2018020944 | A1 | 2/2018 | |
| WO | 2018209222 | A1 | 11/2018 | |

OTHER PUBLICATIONS

Office Action of Chinese Application No. 201810475580.8, dated Nov. 15, 2019, 12 pages.
Office Action for Japanese Application No. 2020-528319, dated Aug. 3, 2021, 5 pages.
Extended European Search Report for Application No. 19802492.9, dated Jan. 26, 2022, 9 pages.

* cited by examiner

BLOCKCHAIN NETWORK TRANSACTION PROCESSING METHOD, APPARATUS, DEVICE, AND STORAGE MEDIUM

This application is a US national phase application of International Application No. PCT/CN2019/072338, filed on Jan. 18, 2019, which is based upon and claims priority to Chinese Patent Application No. 201810475580.8, filed on May 17, 2018, the entire contents of which are incorporated herein by reference.

FIELD

Embodiments of the present disclosure relate to blockchain technologies, for example, to a method, an apparatus, and a device for processing a transaction in a blockchain network and a storage medium.

BACKGROUND

Presently, in a developing ecology of blockchain, two factions are mainly included. One is programmable digital currency based on a UTXO (unspent transaction output) model and another one is general smart contract based on a virtual machine are included.

In a network using the digital currency (such as, bitcoin), the UTXO model is a basic unit of a digital currency transaction. Through a transaction input and a transaction output, the network converts the currency into a digital structure (also referred as transaction, or transaction order). In the UTXO model, the UTXO consumed by a certain transaction may be called as the transaction input, and the UTXO created by the transaction may be called as the transaction output. In this way, digital currency having a certain amount of money is transferred between owners of different private keys, and the UXTO may be consumed and created continually in a chaining transaction.

The smart contract technology is a computer protocol designed to spread, verify or execute a contract in an informatization manner, which is a set of commitments defined in a digital form and includes a protocol on which participants of the contract may execute these commitments. The digital form means that the contract needs to be written in computer readable codes. The smart contract allows a trusted transaction without a third party. Presently, a typical transaction article of the smart contract is automatic account transfer of digital asset (such as, an electronic pet or various electronic game props) based on a pre-determined rule. In the blockchain, the smart contract is generally expressed as a series of code segments executed by a virtual machine. For example, the virtual machine may be an EVM (Ethereum virtual machine) to complete the execution of the smart contract by means of a condition for triggering the contract provided by the blockchain network.

SUMMARY

Subject matters of the present disclosure will be described in detail below. This summary does not limit the protection scope of claims.

Embodiments of the present disclosure provide a method and an apparatus for processing a transaction in a blockchain network, a device, and a storage medium, to realize effective compatibility of transaction submission requests with different execution manners.

Embodiments of the present disclosure provide a method for processing a transaction in a blockchain network. The method includes: obtaining a transaction submission request in form of a readable data field, processing a data field in the transaction submission request; in a case of recognizing that a target field exists during processing the data field, calling a virtual machine to execute logical codes corresponding to the target field; and determining a processing result of the transaction submission request based on a code executing result from the virtual machine and a processing result of the data field.

Further embodiments of the present disclosure provide a device. The device includes a memory, a processor, and a computer program stored in the memory and executable on the processor. When the computer program is executed by the processor, a method for processing a transaction in a blockchain network according to any of embodiments of the present disclosure is implemented.

Further embodiments of the present disclosure provide a storage medium having a computer program stored thereon. When the computer program is executed by a processor, a method for processing a transaction in a blockchain network according to any of embodiments of the present disclosure is executed.

Other aspects may be understood after reading and understand accompanying drawings and detailed description.

BRIEF DESCRIPTION OF THE DRAWINGS

In order to more clearly describe technical solutions of embodiments of the present disclosure, brief introduction will be made below to accompanying drawings used in embodiments. It should be understood that, the accompanying drawings merely illustrate some embodiments of the present disclosure, and should not be considered as a limitation of the scope of the present disclosure. For those skilled in the art, other relevant drawings may be obtained based on these accompanying drawings without any creative labor.

DETAILED DESCRIPTION

Detailed description will be further made below to the present disclosure with reference to the accompanying drawings and embodiments. It should be understood that, the embodiments described herein are intended only to explain the present disclosure, and are not intended to limit the present disclosure. In addition, it also should be noted that, for convenience of description, the accompanying drawings merely illustrate some but not all of the structures related to the present disclosure.

It should be noted that, similar numerals and letters represent similar items in the following drawings. Therefore, once an item is defined in one accompanying drawing, there is no need to make further definitions and explanations in other accompanying drawings. Meanwhile, in the description of the present disclosure, terms "first", "second" and the like are only used for distinguishing features and may not be understood as indicating or implying relative importance.

Presently, developing ecology of blockchain may include programmable digital currency based on a UTXO (unspent transaction output) model and general smart contract based on a virtual machine.

A transaction submission request of a programmable digital currency is generally expressed as a readable data field, and the transaction data is formed by processing data in the readable data field. A transaction submission request of the smart contract is generally expressed as an executable code segment, and the transaction data is formed by executing the codes via the virtual machine. Since the two transaction submission requests are expressed differently, execution manners of the two transaction submission requests are different. Each transaction submission request has its own advantage in application. How to integrate the above two technologies is important and difficult in a current research.

In view of this, embodiments of the present disclosure provide a method and an apparatus for processing a transaction in a blockchain network, related device and storage medium, which may be described below.

Embodiment 1

Figure 1:
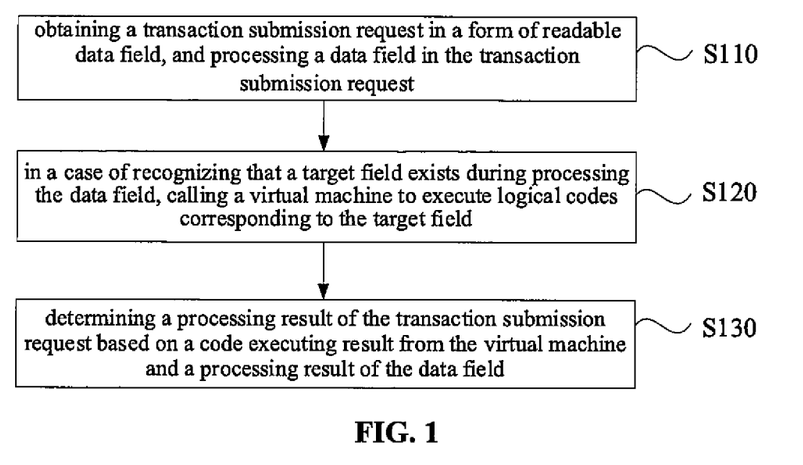
FIG. 1 is a flow chart illustrating a method for processing a transaction in a blockchain network according to Embodiment 1 of the present disclosure.

FIG. 1 is a flow chart illustrating a method for processing a transaction in a blockchain network according to Embodiment 1 of the present disclosure. The method is applicable to a node in a blockchain system. The blockchain may be a public blockchain, an alliance blockchain or a private blockchain. Embodiments may be applied to a case of integrating transaction submission requests with different execution manners, such as integrating the transaction submission request in a form of Ethernet and the transaction submission request in a form of bitcoin. The method may be executed by an apparatus for processing a transaction in a blockchain network according to embodiments of the present disclosure. The apparatus may be implemented in software and/or hardware, and may be integrated in a computing device functioning as the node of the blockchain system. As illustrated in FIG. 1, the method may include blocks S110, S120 and S130.

At block S110, a transaction submission request in a form of a readable data field is obtained, and a data field in the transaction submission request is processed.

The transaction submission request refers to a transaction occurring or to be processed within a period of time for the blockchain system. The transaction submission request in the form of readable data field refers to that the content of each transaction submission request is recorded in the form of readable field, such as the transaction submission request in the form of bitcoin, Leyte, Hyperledger, or R3 Corda. The data field may include, but be not limited to, addresses of both parties related to the transaction submission request, a requested transaction, and a timestamp. In an example, the transaction submission request may include order data for implementing a digital currency transaction. The order data may include order data of an unspent transaction output.

The transaction submission request in the form of the bitcoin is taken as an example for illustration. The form of bitcoin refers to that each transaction request is embodied by inflow and outflow of bitcoin. Each transaction request is recorded in a field content of the bitcoin. The field content of the bitcoin may include an address of an inflow account, an amount of money of bitcoins, an address of an outflow account, a transaction time, and the like.

In an example, processing the data field in the transaction submission request may be verifying validity of the addresses of both parties related to the transaction submission request in the data field. In a case that the transaction submission request is contract query information, processing the data field in the transaction submission request may be authenticating the contract. In a case that the transaction submission request is a transaction request, processing the data field in the transaction submission request may be authenticating the addresses of both parties related to the transaction, authenticating validity of amount of money for an account transfer operation, and processing the account transfer operation.

At block S120, in a case of recognizing that a target field exists during processing the data field, a virtual machine is called to execute logical codes corresponding to the target field.

The virtual machine refers to a whole computer system that is simulated by software to have functions of a whole hardware system and operate in a completely isolated environment. In embodiments, the virtual machine is configured to execute logic codes corresponding to the transaction submission request to implement corresponding functions. For example, the virtual machine may implement logics of transferring electronic asset. The virtual machine may include an Ethernet virtual machine, an EOS (enterprise operation system) virtual machine and the like. The logical codes, for example, may include codes for transferring a virtual article. The virtual article refers to a virtual electronic asset that may be used for transaction, such as a digital doge or a fortune cat. For example, the logical codes are executed to transfer the digital dog of a user A to another user B.

The target field is used for implementing the transaction submission request in the form of the readable data field, such as the transaction submission request in the form of the bitcoin. The target field is a bridge for operations on the virtual machine. The target field may be an address of the logical codes, a function name matching the logical codes, or an address or a serial number of the virtual machine. In addition, the target field may be a correspondence between the virtual machine and the address of the logical codes. In an example, in order to quickly and accurately recognize that the target field exists, the target field may be defined in a set format. The target field only needs to be set in accordance with an agreement to enable the node to recognize that the logical codes correspond to the target field.

In an example, the node may be provided with multiple interfaces for interacting with multiple virtual machines. The multiple virtual machines are independent to each other. In an example, different target fields correspond to different virtual machines, and different target fields correspond to different addresses of the logical codes. These characteristics may be used to call the virtual machine to execute the logical codes corresponding to the target field. For example, in cases that the address of the virtual machine and the address of the logical codes are stored in the target field, the virtual machine and logical codes may be determined based on the target field. The virtual machine may be controlled to execute the logical codes.

At block S130, a processing result of the transaction submission request is determined based on a code executing result from the virtual machine and a processing result of the data field.

The code executing result may generally include successful operation or failed operation. In an example, the code executing result may be a returned value, or the like. In cases that the virtual article is the digital doge, the code executing result may be that the digital doge of the user A is successfully transferred to another user B, or the digital doge of the user A is not successfully transferred to another user B. For the transaction submission request in the form of the bitcoin, the processing result of the data field may be realizing the account transfer from an account B to an account A. The processing result of the transaction submission request is a result of processing the transaction submission request, such as a result of performing the account transfer, a result of authenticating a contract, and the like.

In an example, if the code executing results from the virtual machine are different, the processing results of the transaction submission request are different. The following will describe several solutions for determining the processing result of the transaction submission request based on the code executing result from the virtual machine and the processing result of the data field.

When a native node is a node for generating a current block, after the processing result of the transaction submission request is determined, the method may further include writing the processing result of the transaction submission request into a corresponding block. When the native node is not the node for generating the current block, after the processing result of the transaction submission request is determined, the method may also include sending the processing result of the transaction submission request to another node in the blockchain system, or verifying data about block transaction.

It should be noted that, in the related art, an abstraction layer is constructed by writing a large amount of codes to implement the conversion among transaction submission requests in different forms, causing a large programming workload. Meanwhile, once the data structure corresponding to a transaction submission request changes, the codes in the abstraction layer also need to be adjusted adaptively, resulting in that generality and stability of the integration system are poor. However, in embodiments of the present disclosure, the virtual machine is called to execute the corresponding logical codes based on the target field recognized during processing the data field, which may implement the logics of transferring the electronic asset. The processing result of the transaction submission request may be determined based on the code executing result from the virtual machine and the processing result of the data field, to realize effective integration of the transaction submission request and the account transfer of the electronic asset, thereby enriching the digital transaction and improving flexibility of the digital transaction while fully retaining advantages of respective transaction submission requests in different forms.

With the technical solution of embodiments of the present disclosure, the virtual machine is called to execute the logical codes corresponding to the target field based on the target field in the data field of the transaction submission request in the form of the readable data field, which may implement the logics of transferring the electronic asset. The processing result of the transaction submission request is determined based on the code executing result from the virtual machine and the processing result of the data field. An effective compatibility of transaction submission requests in different execution manners is realized. Meanwhile, a new idea is provided for the transaction processing of the blockchain network, such that the transaction submission request in the form of readable data field and the transaction submission request in the form of logical codes may be effectively compatible. Therefore, the blockchain network has a strong power on the transaction processing, and allows to process a transaction submission request with various functions.

Embodiment 2

Figure 2:
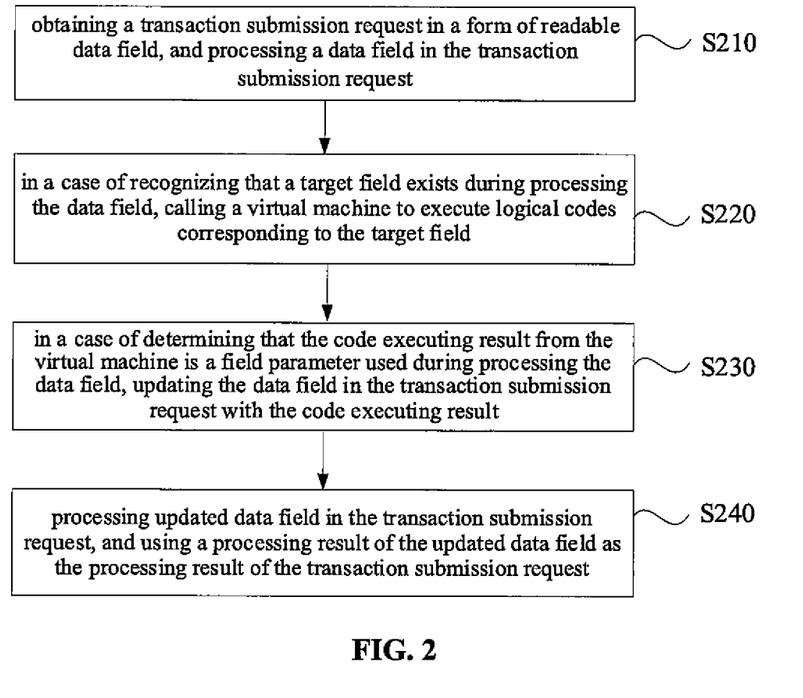
FIG. 2 is a flow chart illustrating a method for processing a transaction in a blockchain network according to Embodiment 2 of the present disclosure.

FIG. 2 is a flow chart illustrating a method for processing a transaction in a blockchain network according to Embodiment 2 of the present disclosure. This embodiment, on the basis of the above embodiment, makes a further description for determining the processing result of the transaction submission request based on the code executing result from the virtual machine and the processing result of the data field. As illustrated in FIG. 2, the method in embodiments may include blocks S210, S220, S230 and S240.

At block S210, the transaction submission request in the form of readable data field is obtained, and the data field in the transaction submission request is processed.

At block S220, in cases of recognizing that the target field exists during processing the data field, the virtual machine is called to execute logical codes corresponding to the target field.

At block S230, in cases of determining that the code executing result from the virtual machine is a field parameter used during processing the data field, the data field in the transaction submission request is updated with the code executing result.

The field parameter refers to a parameter required for processing the data field.

The transaction submission request in the form of bitcoin is taken as an example for description. The field parameter may be the amount of money of bitcoins. In detail, when the native node recognizes that the target field exists during processing the data field, the logical codes and the virtual machine may be obtained based on the target field, and the virtual machine is controlled to execute the logical codes. In cases that the code executing result returned from the virtual machine is that the amount of money of the account transfer (or the amount of money of bitcoins) is 50, the value corresponding to the amount of money of the account transfer in the data field in the transaction submission request is updated to 50.

At block S240, updated data field in the transaction submission request is processed, and a processing result of the updated data field is used as the processing result of the transaction submission request.

For example, the transaction submission request in the form of bitcoin is the account transfer from an account B to an account A. Processing the updated data field in the transaction submission request may be firstly verifying whether an amount of money held by the account B is greater than or equal to 50. When the verification is successful, the account transfer is executed. When the verification is failed, the data field is processed based on a failure processing strategy. The failure processing strategy may include: directly discarding the data field, or writing the processing result of the transaction submission request matching the data field into a corresponding block.

Correspondingly, the processing result of the data field is completing the account transfer, that is, the amount of money valued 50 of the account B is transferred to the account A.

With the technical solution of embodiments of the present disclosure, in cases of determining that the code executing result from the virtual machine is the field parameter used during processing the data field, the data field is updated, and the processing result of the updated data field is used as the processing result of the transaction submission request, thereby implementing the effective compatibility of transaction submission requests in different execution manners while fully retaining the advantages of respective transaction submission requests in different forms.

Embodiment 3

Figure 3:
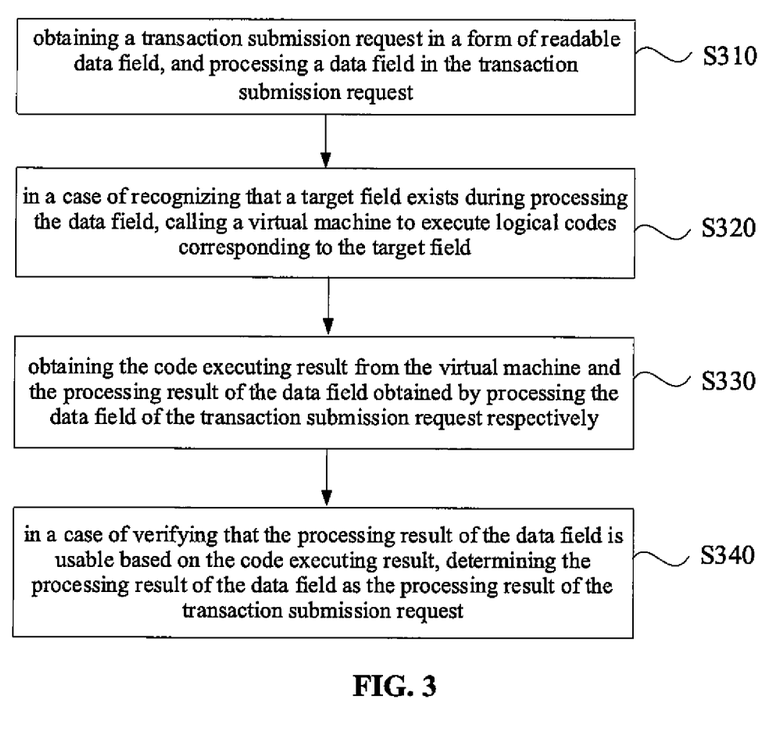
FIG. 3 is a flow chart illustrating a method for processing a transaction in a blockchain network according to Embodiment 3 of the present disclosure.

FIG. 3 is a flow chart illustrating a method for processing a transaction in a blockchain network according to Embodiment 3 of the present disclosure. This embodiment, on the basis of the above embodiments, further provides a method for determining the processing result of the transaction submission request based on the code executing result from the virtual machine and the processing result of the data field. As illustrated in FIG. 3, the method in embodiments may include block S310, S320, S330 and S340.

At block S310, the transaction submission request in the form of readable data field is obtained, and the data field of the transaction submission request is processed.

At block S320, in cases of recognizing that the target field exists during processing the data field, the virtual machine is called to execute the logical codes corresponding to the target field.

At block S330, the code executing result from the virtual machine is obtained and the processing result of the data field obtained by processing the data field of the transaction submission request is obtained.

At block S340, in cases of verifying that the processing result of the data field is usable based on the code executing result, the processing result of the data field is determined as the processing result of the transaction submission request.

In an example, the transaction submission request includes data about an order for implementing a digital currency transaction, and the logical codes include codes for implementing a transfer operation of a virtual article. Typically, when the result returned from the virtual machine is "true", it may be determined that the virtual article is successfully transferred, and the transfer operation matching the order of the digital currency transaction is executed. When the result returned from the virtual machine is "false", it may be determined that the virtual article is not successfully transferred, and the transfer operation is abandoned.

For example, when the digital doge of the account A is successfully transferred to another account B, the virtual machine may return a result, i.e., "true", to the native node. The native node may transfer an amount of money held by the account B, such as 50, to the account A to implement the account transfer operation after receiving the code executing result from the virtual machine. The result obtained by processing the data field via the native node is that the amount of money held by the account B, such as 50, is transferred to the account A, which is the same as the code executing result from the virtual machine, i.e., "true".

Therefore, in embodiments of the present disclosure, when the code executing result received by the native node from the virtual machine is "true", the processing result of the data field is determined as the processing result of the transaction submission request and directly written into a block or sent to another node in the blockchain system.

In an example, when the code executing result received by the native node from the virtual machine is "false", the data field is processed based on the failure processing policy. The failure processing policy may include: directly discarding the data field, or writing the processing result of the transaction submission request matching the data field into the corresponding block.

It should be noted that, in embodiments of the present disclosure, the account transfer is executed only when the virtual article is successfully transferred, that is, when the code executing result received by the native node from the virtual machine is "true".

With the technical solution of embodiments of the present disclosure, based on the code executing result from the virtual machine, the usability of the processing result of the data field is verified. When the processing result of the data field is usable, the processing result of the data field is determined as the processing result of the transaction submission request, thereby ensuring the consistency of the processing results of transaction submission requests in two forms.

Without considering the result from the virtual machine, in an example, determining the processing result of the transaction submission request based on the code executing result from the virtual machine and the processing result of the data field may include the following. The code executing result from the virtual machine is obtained and the processing result of the data field obtained by processing the data field of the transaction submission request is obtained. A combination of the code executing result and the processing result of the data field is determined as the processing result of the transaction submission request.

In detail, when the function executed by the logical codes is transferring the digital doge from the account A to the account B, the virtual machine may return the code executing result back to the native node after executing the logical codes corresponding to the target field. The native node may transfer the amount of money held by the account B, such as 50, to the account A after receiving the code executing result, to implement the account transfer. In order to facilitate verification of the transaction submission request subsequently by other nodes in the blockchain system, the code executing result and the processing result of the data field may be combined as the processing result of the transaction submission request.

It should be noted that this embodiment does not pay attention to the code executing result from the virtual machine, but the code executing result is only used as a triggering signal for performing the account transfer.

Embodiment 4

Figure 4:
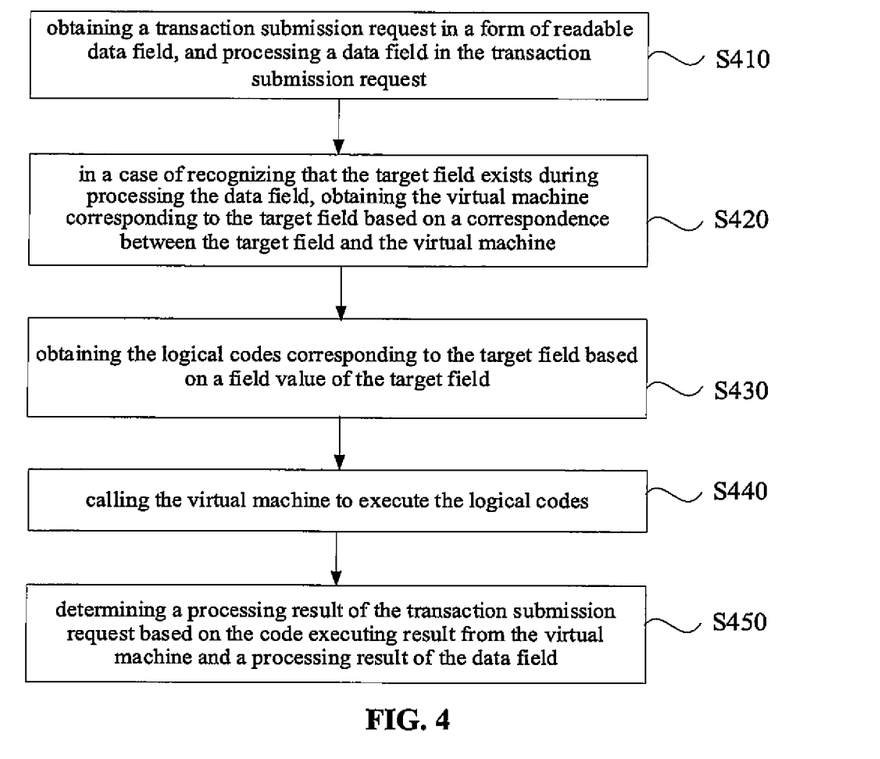
FIG. 4 is a flow chart illustrating a method for processing a transaction in a blockchain network according to Embodiment 4 of the present disclosure.

FIG. 4 is a flow chart illustrating a method for processing a transaction in a blockchain network according to Embodiment 4 of the present disclosure. This embodiment, on the basis of the above embodiments, provides a method for calling the virtual machine to execute the logical codes corresponding to the target field in cases of recognizing that the target field exists during processing the data field. As illustrated in FIG. 4, the method in embodiments may include block S410, S420, S430, S440, and S450.

At block S410, the transaction submission request in the form of readable data field is obtained, and the data field in the transaction submission request is processed.

At block S420, in cases of recognizing that the target field exists during processing the data field, the virtual machine corresponding to the target field is obtained based on a correspondence between the target field and the virtual machine.

In detail, the target fields having different definition formats may correspond to different virtual machines. In an example, the target fields having the same definition format may include an identification bit, such that a value of the identification bit is used to distinguish the virtual machines. In another example, a serial number or an address of the virtual machine is stored in the target field. Embodiments of the present disclosure do not limit to the way of obtaining the corresponding virtual machine based on the target field, as long as the virtual machine corresponding to the target field may be accurately determined. The format of the target field may be any data format that may be recognized by a computer.

At block S430, the logical codes corresponding to the target field are obtained based on a field value of the target field.

The field value of the target field may be one or more of followings: a storage address of the logical codes, a function name matching the logical codes, and an identifier of a function of the logical codes. In an example, different target fields correspond to different field values. Therefore, the logical codes corresponding to the target field may be obtained based on the field value of the target field.

At block S440, the virtual machine is called to execute the logical codes.

In detail, when the native node recognizes that the data field includes the target field during processing the data field of the transaction submission request, the virtual machine and the logical codes corresponding to the target field are obtained based on the target field, and the corresponding virtual machine is controlled to execute the corresponding logical codes.

At block S450, the processing result of the transaction submission request is determined based on the code executing result from the virtual machine and the processing result of the data field.

It should be noted that, in embodiments, the native node may obtain both the virtual machine and the logical codes corresponding to the target field directly based on the field value of the target field and the target field, and then control the corresponding virtual machine to execute the corresponding logical codes, thereby improving the whole efficiency of processing the transaction submission request.

With the technical solution of embodiments of the present disclosure, the virtual machine and the logical codes corresponding to the target field are determined based on the field value of the target field and the target field, the virtual machine is called to execute the logical codes, thereby realizing logics of transferring the electronic asset. The processing result of the transaction submission request is determined based on the code executing result from the virtual machine and the processing result of the data field. An effective integration of the transaction submission request and the transfer of the electronic asset is realized, the digital transaction is enriched and flexibility of the digital transaction is improved while fully retaining the advantages of respective transaction submission requests in different forms.

Embodiment 5

Figure 5:
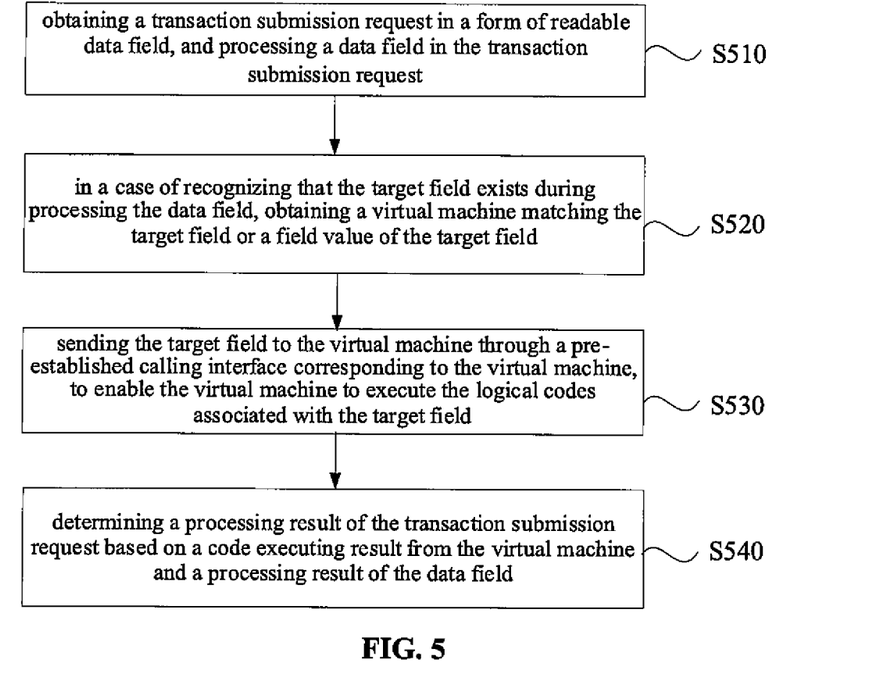
FIG. 5 is a flow chart illustrating a method for processing a transaction in a blockchain network according to Embodiment 5 of the present disclosure.

FIG. 5 is a flow chart illustrating a method for processing a transaction in a blockchain network according to Embodiment 5 of the present disclosure. This embodiment, on the basis of the above embodiments, provides a method for calling the virtual machine to execute the logical codes corresponding to the target field in cases of recognizing that the target field exists during processing the data field. As illustrated in FIG. 5, the method in embodiments may include blocks S510, S520, S530, and S540.

At block 510, the transaction submission request in the form of readable data field is obtained, and the data field in the transaction submission request is processed.

At block 520, in cases of recognizing that the target field exists during processing the data field, the virtual machine matching the target field or a field value of the target field is obtained.

In an example, the target field has an identifier or an address of the virtual machine stored therein. The identifiers or the addresses corresponding to different virtual machines are different. The identifier or the address may be the target field, the field value of the target field, or a certain value or an identification bit in the target field. Therefore, the virtual machine matching the target field may be obtained based on the target field or a certain characteristic of the target field, such as the field value.

At block S30, the target field is sent to the virtual machine through a pre-established calling interface corresponding to the virtual machine, to enable the virtual machine to execute the logical codes associated with the target field.

The correspondence between the target field and the logical codes may be pre-stored in the virtual machine.

In an example, different virtual machines interact with the native node through different interfaces. In embodiments of the present disclosure, since the correspondence between the target field and the logical codes is pre-stored in each virtual machine, the native node may send the target field to the virtual machine by calling the interface through which the native node interacts with the virtual machine after obtaining the corresponding virtual machine based on the field value of the target field or the target field. The virtual machine may execute the corresponding logical codes. This method may simplify a storage form of the target field in the data field, thereby improving the whole efficiency of processing the transaction submission request.

At block 540, the processing result of the transaction submission request is determined based on the code executing result from the virtual machine and the processing result of the data field.

With the technical solution of embodiments of the present disclosure, the virtual machine is obtained based on the target field in the data field of the transaction submission request. The target field is sent to the virtual machine, such that the virtual machine executes the logical codes corresponding to the target field, thereby simplifying the storage form of the target field in the data field and improving the entire efficiency of processing the transaction submission request. The processing result of the transaction submission request is determined based on the code executing result from the virtual machine and the processing result of the data field, thereby realizing an effective integration of the transaction submission request and the transfer of the electronic asset. The digital transaction is enriched and the flexibility of the digital transaction is improved while fully retaining the advantages of the transaction submission requests in different forms.

Embodiment 6

Figure 6:
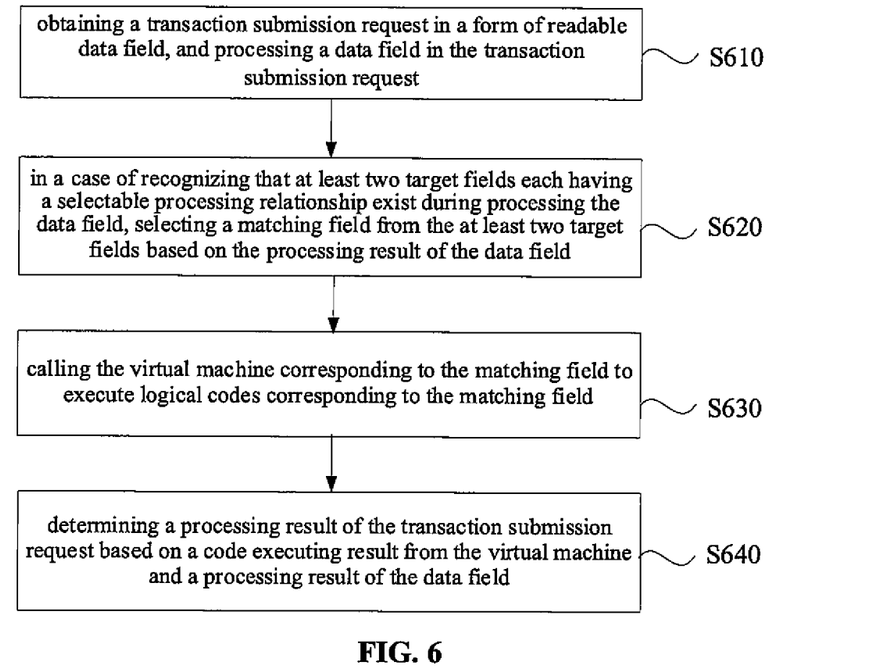
FIG. 6 is a flow chart illustrating a method for processing a transaction in a blockchain network according to Embodiment 6 of the present disclosure.

FIG. 6 is a flow chart illustrating a method for processing a transaction in a blockchain network according to Embodiment 6 of the present disclosure. This embodiment, on the basis of the above embodiments, provides a method for calling the virtual machine to execute the logical codes corresponding to the target field in cases of recognizing that the target field exists during processing the data field. As illustrated in FIG. 6, the method in embodiments may include blocks S610, S620, S630, and S640.

At block S610, the transaction submission request in the form of readable data field is obtained, and the data field in the transaction submission request is processed.

At block S620, in cases of recognizing that at least two target fields each having a selectable processing relationship exist during processing the data field, a matching field is selected from the at least two target fields based on the processing result of the data field.

The selectable processing relationship refers to that the data field of one transaction submission request corresponds to at least two logical codes available for execution. How to select a matching field from the logical codes may be determined based on processing results of other data fields. A current processing result may be a processing result of other data fields in the data field except the target field.

For example, the data field of the transaction submission request corresponds to two logical codes A and B, and the processing result of the current field is a value. The logical code A may be executed when the value is greater than a preset value, and the target field corresponding to the logical code A may be determined as the matching field. The logical code B may be executed when the value is smaller than the preset value, and the target field corresponding to the logical code B may be determined as the matching field. The current processing result of the data field may be used to select a matched target field.

In an example, when the processing result of the current field is an input parameter of a function matching a certain logical code, the target field corresponding to the current field may be directly determined as the matching field.

At block S630, the virtual machine corresponding to the matching field is called to execute the logical codes corresponding to the matching field.

After the matching field is determined, the virtual machine corresponding to the matching field and the logical codes may be determined based on the matching field and the field value of the matching field, and the virtual machine corresponding to the matching field is controlled to execute the logical codes corresponding to the matching field. The correspondence between the field and the logical codes may be stored in the virtual machine in advance. The virtual machine corresponding to the matching field may be determined based on the matching field or the field value of the matching field, and the matching field may be sent to the virtual machine, to enable the virtual machine to execute the corresponding logical codes.

At block S640, the processing result of the transaction submission request is determined based on the code executing result from the virtual machine and the processing result of the data field.

With the technical solution of embodiments of the present disclosure, in cases of recognizing that the at least two target fields each having the selectable processing relationship exists, the matching field is selected based on the current processing result of the data field, thereby realizing a function of selecting and executing a part of logical codes. The virtual machine corresponding to the matching field is called to execute the logical codes corresponding to the matching field, and the processing result of the transaction submission request is determined based on the code executing result from the virtual machine and the processing result of the data field. An effective integration of the transaction submission request and the transfer of the electronic asset is realized, the digital transaction is enriched and the flexibility of the digital transaction is improved while fully retaining the advantages of the respective transaction submission requests in different forms.

Embodiment 7

Figure 7:
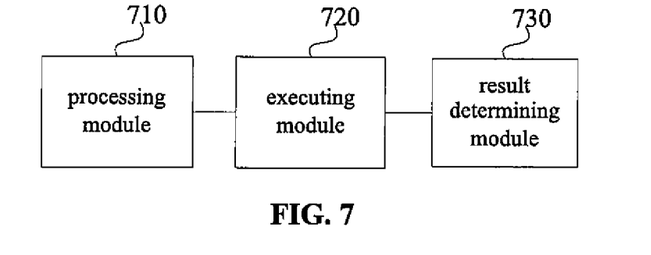
FIG. 7 is a block diagram illustrating an apparatus for processing a transaction in a blockchain network according to Embodiment 7 of the present disclosure.

FIG. 7 is a block diagram illustrating an apparatus for processing a transaction in a blockchain network according to Embodiment 7 of the present disclosure. The apparatus may execute the method for processing a transaction in a blockchain network according to any one of embodiments of the present disclosure and may have corresponding functional modules for executing the method and advantageous effects of the method. The apparatus may be integrated in a computing device functioning as a node of the blockchain system. As illustrated in FIG. 7, the apparatus may include: a processing module 710, an executing module 720, and a result determining module 730.

The processing module 710 is configured to obtain a transaction submission request in a form of readable data field and process a data field in the transaction submission request.

The executing module 720 is configured to, in cases of recognizing that a target field exists during processing the data field, call a virtual machine to execute logical codes corresponding to the target field.

The result determining module 730 is configured to determine a processing result of the transaction submission request based on a code executing result from the virtual machine and a processing result of the data field.

With the technical solution of embodiments of the present disclosure, the virtual machine may be called to execute the logical codes corresponding to the target field, based on the target field in the data field of the transaction submission request in the form of readable data field. The processing result of the transaction submission request may be determined based on the code executing result from the virtual machine and the processing result of the data field. An effective compatibility of transaction submission requests with different execution manners is realized. Meanwhile, a new idea is provided for the transaction processing of the blockchain network, such that the transaction submission request in the form of readable data field and the transaction submission request in the form of logical codes may be effectively compatible. Therefore, the blockchain network has a strong power on the transaction processing, and allows to process a transaction submission request with various functions.

In an implementation, the result determining module 730 is also configured to: in a case of determining that the code executing result from the virtual machine is a field parameter used during processing the data field, update the data field in the transaction submission request with the code executing result; and process updated data field in the transaction submission request, and use a processing result of the updated data field as the processing result of the transaction submission request.

In an implementation, the result determining module 730 is also configured to: obtain the code executing result from the virtual machine and obtain the processing result of the data field obtained by processing the data field of the transaction submission request; and in a case of verifying that the processing result of the data field is usable based on the code executing result, determine the processing result of the data field as the processing result of the transaction submission request.

In an implementation, the result determining module 730 is also configured to: obtain the code executing result from the virtual machine and obtain the processing result of the data field obtained by processing the data field of the transaction submission request; and determine a combination of the code executing result and the processing result of the data field as the processing result of the transaction submission request.

In an implementation, the executing module 720 is also configured to, in a case of recognizing that the target field exists during processing the data field, obtain the virtual machine corresponding to the target field based on a correspondence between the target field and the virtual machine; obtain the logical codes corresponding to the target field based on a field value of the target field; and call the virtual machine to execute the logical codes.

In an example, the field value of the target field includes a storage address of the logical codes and/or a function name matching the logical codes.

In an implementation, the executing module 720 is also configured to, in a case of recognizing that the target field exists during processing the data field, obtain a virtual machine matching the target field or a field value of the target field; and send the target field to the virtual machine through a pre-established calling interface corresponding to the virtual machine, to enable the virtual machine to execute the logical codes associated with the target field.

In an example, a correspondence between the target field and the logical codes is pre-stored in the virtual machine.

In an implementation, the executing module 720 is also configured to, in a case of recognizing that at least two target fields each having a selectable processing relationship exist during processing the data field, select a matching field from the at least two target fields based on a current processing result of the data field; and call the virtual machine corresponding to the matching field to execute logical codes corresponding to the matching field.

In an example, the transaction submission request includes order data for implementing a digital transaction; and the logical codes include codes for implementing a transfer function of virtual articles.

In an example, the order data includes order data of unspent transaction output, and the virtual machine includes an Ethereum virtual machine.

Embodiment 8

Figure 8:
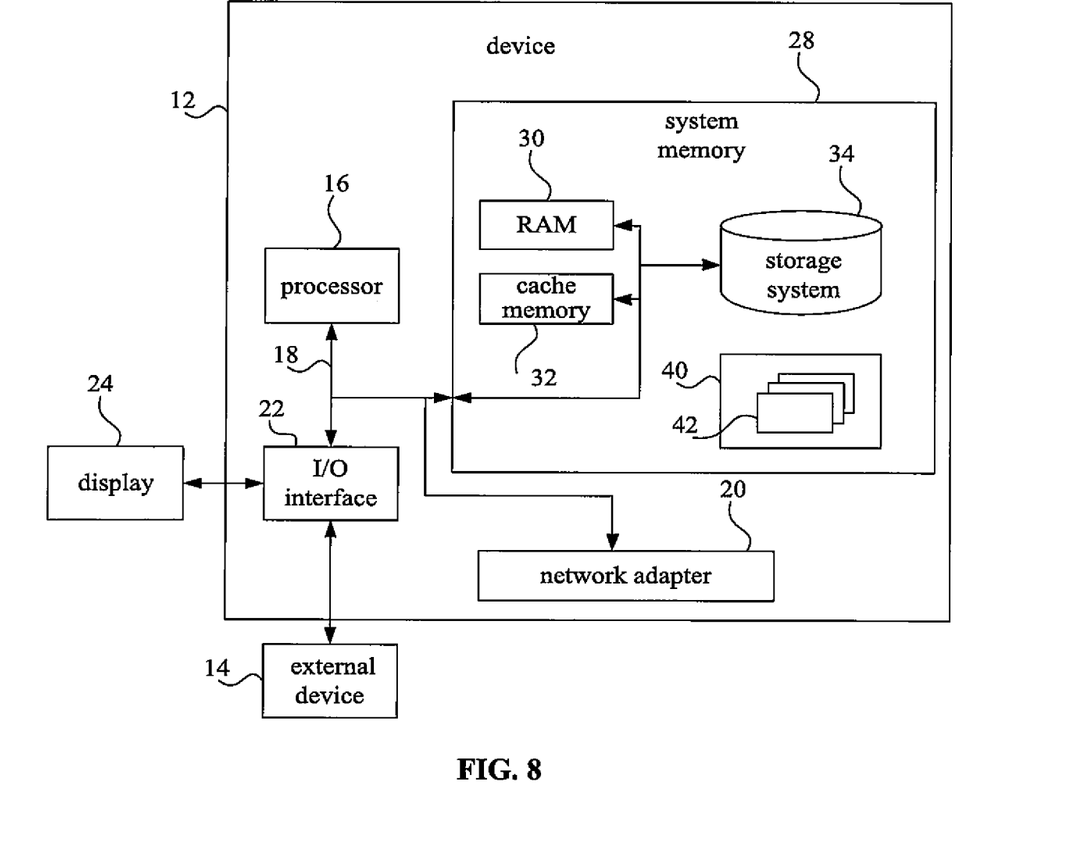
FIG. 8 is a schematic diagram illustrating a device according to Embodiment 8 of the present disclosure.

FIG. 8 is a schematic diagram illustrating a device according to Embodiment 8 of the present disclosure. FIG. 8 illustrates a block diagram of an exemplary device 12 applicable to implement embodiments of the present disclosure. The device 12 illustrated in FIG. 8 is only an example, which may not bring any limitation to functions and scope of embodiments of the present disclosure. The device 12 may typically be a computing device that functions as a node of a blockchain system.

As illustrated in FIG. 8, the device 12 is presented in form of a general-purpose computing device. Components of the device 12 may include but be not limited to: one or more processors or processing units 16, a system memory 28, and a bus 18 connecting different system components (including the system memory 28 and the processor 16).

The bus 18 represents one or more of several bus structures, including a storage bus or a local bus with any bus structure in the plurality of bus structures and being employed by a storage controller, a peripheral bus, an accelerated graphics port and a processor. For example, these architectures include, but are not limited to, an industry standard architecture (ISA) bus, a micro channel architecture (MCA) bus, an enhanced ISA bus, a video electronics standards association (VESA) local bus and a peripheral component interconnection (PCI) bus.

The device 12 typically includes a plurality of computer system readable mediums. These mediums may be any usable medium that may be accessed by the device 12, including volatile and non-volatile mediums, removable and non-removable mediums.

The system memory 28 may include computer system readable mediums in the form of volatile medium, such as a random-access memory (RAM) 30 and/or a high-speed cache memory 32. The device 12 may further include other removable/non-removable, volatile/non-volatile computer system storage mediums. Only as an example, the storage system 34 may be configured to read from and write to non-removable, non-volatile magnetic mediums (not illustrated in FIG. 8, and usually called "a hard disk driver"). Although not illustrated in FIG. 8, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected to the bus 18 by one or more data medium interfaces. The system memory 28 may include at least one program product. The program product has a set of program modules (such as, at least one program module), and these program modules are configured to execute functions of respective embodiments of the present disclosure.

A program/utility tool 40, having a set (at least one) of program modules 42, may be stored in the system memory 28. Such program modules 42 include, but not are limited to, an operating system, one or more application programs, other program modules, and program data. Each or any combination of these examples may include an implementation of a network environment. The program module 42 usually executes functions and/or methods described in embodiments of the present disclosure.

The device 12 may communicate with one or more external devices 14 (such as a keyboard, a pointing device, and a display 24), may also communicate with one or more devices enabling a user to interact with the device 12, and/or may communicate with any device (such as a network card, and a modem) enabling the device 12 to communicate with one or more other computing devices. Such communication may occur via an input/output (I/O) interface 22. In addition, a display 24 of the device 12 in this embodiment does not exist as a separate individual, but is embedded in a mirror surface. When a display surface of the display 24 is not displayed, the display surface of the display 24 and the mirror surface are visually integrated. Moreover, the device 12 may further communicate with one or more networks (such as local area network (LAN), wide area network (WAN) and/or public network, such as Internet) via a network adapter 20. As illustrated in FIG. 8, the network adapter 20 communicates with other modules of the device 12 via the bus 18. It should be understood that, although not illustrated in FIG. 8, other hardware and/or software modules may be used in combination with the device 12, including but being not limited to: microcode, device drivers, redundant processing units, external disk drive arrays, RAID (redundant array of independent disks) systems, tape drives, and data backup storage systems, etc.

The processor 16, by operating programs stored in the system memory 28, executes various function applications and data processing, for example implements a method for processing a transaction in a blockchain network according to embodiments of the present disclosure.

Embodiment 9

Embodiment 9 of the present disclosure also provides a computer readable storage medium having a computer program stored thereon. The computer program is configured to implement the method for processing a transaction in a blockchain network according to any one of embodiments of the present disclosure when executed by a computer processor. The computer readable storage medium may be configured in a node of the blockchain system.

Any combination of one or more computer readable mediums may be employed. The computer readable medium may be a computer readable signal medium or a computer readable storage medium. The computer readable storage medium may be, such as, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium may be any tangible medium that contains or stores a program. The program may be used by or in conjunction with an instruction execution system, apparatus or device.

The computer readable signal medium may include a data signal transmitted in the baseband or as a part of a carrier, in which computer readable program codes are carried. The transmitted data signal may employ a plurality of forms, including but not limited to, an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

Although a specific illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for processing a transaction in a blockchain network, comprising:
   obtaining a transaction submission request in a form of readable data field, and processing a data field in the transaction submission request;
   calling a virtual machine to execute logical codes corresponding to a target field in a case of recognizing that the target field exists in the data field during processing the data field; and
   determining a processing result of the transaction submission request based on a code executing result from the virtual machine and a processing result of the data field.

2. The method of claim 1, wherein determining the processing result of the transaction submission request based on the code executing result from the virtual machine and the processing result of the data field comprises:
   in a case of determining that the code executing result from the virtual machine is a field parameter used during processing the data field, updating the data field in the transaction submission request with the code executing result; and
   processing updated data field in the transaction submission request, and using a processing result of the updated data field as the processing result of the transaction submission request.

3. The method of claim 1, wherein determining the processing result of the transaction submission request based on the code executing result from the virtual machine and the processing result of the data field comprises:
   obtaining the code executing result from the virtual machine and the processing result of the data field obtained by processing the data field of the transaction submission request, respectively; and
   in a case of verifying that the processing result of the data field is usable based on the code executing result, determining the processing result of the data field as the processing result of the transaction submission request.

4. The method of claim 1, wherein determining the processing result of the transaction submission request based on the code executing result from the virtual machine and the processing result of the data field comprises:
   obtaining the code executing result from the virtual machine and the processing result of the data field obtained by processing the data field of the transaction submission request, respectively; and
   determining a combination of the code executing result and the processing result of the data field as the processing result of the transaction submission request.

5. The method of claim 1, wherein calling the virtual machine to execute the logical codes corresponding to the target field in the case of recognizing that the target field exists during processing the data field comprises:

in the case of recognizing that the target field exists during processing the data field, obtaining a virtual machine corresponding to the target field based on a correspondence between the target field and the virtual machine;

obtaining the logical codes corresponding to the target field based on a field value of the target field; and calling the virtual machine to execute the logical codes.

6. The method of claim 5, wherein the field value of the target field comprises: a storage address of the logical codes, and/or a function name matching the logical codes.

7. The method of claim 1, wherein calling the virtual machine to execute the logical codes corresponding to the target field in the case of recognizing that the target field exists during processing the data field comprises:

in the case of recognizing that the target field exists during processing the data field, obtaining a virtual machine matching the target field or a field value of the target field; and sending the target field to the virtual machine through a pre-established calling interface corresponding to the virtual machine, to enable the virtual machine to execute the logical codes associated with the target field, wherein, a correspondence between the target field and the logical codes is pre-stored in the virtual machine.

8. The method of claim 1, wherein calling the virtual machine to execute the logical codes corresponding to the target field in the case of recognizing that the target field exists during processing the data field further comprises:

in a case of recognizing that at least two target fields each having a selectable processing relationship exist during processing the data field, selecting a matching field from the at least two target fields based on the processing result of the data field; and calling the virtual machine corresponding to the matching field to execute logical codes corresponding to the matching field.

9. The method of claim 1, wherein the transaction submission request comprises order data for implementing a digital currency transaction; and the logical codes comprise codes for implementing a transfer function of virtual articles.

10. The method of claim 9, wherein, the order data comprises order data of unspent transaction output, and the virtual machine comprises an Ethereum virtual machine.

11. A device, comprising:
one or more processors; and
a storage device, configured to store one or more programs,
wherein when the one or more programs are executed by the one or more processors, the one or more processors are configured to
obtain a transaction submission request in a form of readable data field, and process a data field in the transaction submission request;
call a virtual machine to execute logical codes corresponding to a target field in a case of recognizing that the target field exists in the data field during processing the data field; and
determine a processing result of the transaction submission request based on a code executing result from the virtual machine and a processing result of the data field.

12. The device of claim 11, wherein the one or more processors are further configured to:
in a case of determining that the code executing result from the virtual machine is a field parameter used during processing the data field, update the data field in the transaction submission request with the code executing result; and
process updated data field in the transaction submission request, and use a processing result of the updated data field as the processing result of the transaction submission request.

13. The device of claim 11, wherein the one or more processors are further configured to:
obtain the code executing result from the virtual machine and the processing result of the data field obtained by processing the data field of the transaction submission request, respectively; and
in a case of verifying that the processing result of the data field is usable based on the code executing result, determine the processing result of the data field as the processing result of the transaction submission request.

14. The device of claim 11, wherein the one or more processors are further configured to:
obtain the code executing result from the virtual machine and the processing result of the data field obtained by processing the data field of the transaction submission request, respectively; and
determine a combination of the code executing result and the processing result of the data field as the processing result of the transaction submission request.

15. The device of claim 11, wherein the one or more processors are further configured to:
in the case of recognizing that the target field exists during processing the data field, obtain a virtual machine corresponding to the target field based on a correspondence between the target field and the virtual machine;
obtain the logical codes corresponding to the target field based on a field value of the target field; and
call the virtual machine to execute the logical codes.

16. The device of claim 11, wherein the one or more processors are further configured to:
in the case of recognizing that the target field exists during processing the data field, obtain a virtual machine matching the target field or a field value of the target field; and
send the target field to the virtual machine through a pre-established calling interface corresponding to the virtual machine, to enable the virtual machine to execute the logical codes associated with the target field,
wherein, a correspondence between the target field and the logical codes is pre-stored in the virtual machine.

17. The device of claim 11, wherein the one or more processors are further configured to:
in a case of recognizing that at least two target fields each having a selectable processing relationship exist during processing the data field, select a matching field from the at least two target fields based on the processing result of the data field; and
call the virtual machine corresponding to the matching field to execute logical codes corresponding to the matching field.

18. The device of claim 11, wherein the transaction submission request comprises order data for implementing a digital currency transaction; and the logical codes comprise codes for implementing a transfer function of virtual articles.

19. A non-transitory computer readable storage medium having a computer program stored thereon, wherein a method for processing a transaction in a blockchain network is implemented when the computer program is executed by a processor, the method comprises:

obtaining a transaction submission request in a form of readable data field, and processing a data field in the transaction submission request;

calling a virtual machine to execute logical codes corresponding to a target field in a case of recognizing that the target field exists in the data field during processing the data field; and determining a processing result of the transaction submission request based on a code executing result from the virtual machine and a processing result of the data field.

20. The non-transitory computer readable storage medium of claim 19, wherein the order data comprises order data of unspent transaction output, and the virtual machine comprises an Ethereum virtual machine.

* * * * *